(No Model.)
W. J. PHELPS.
APPARATUS FOR SOLDERING METALLIC VESSELS.
No. 468,896.  Patented Feb. 16, 1892.
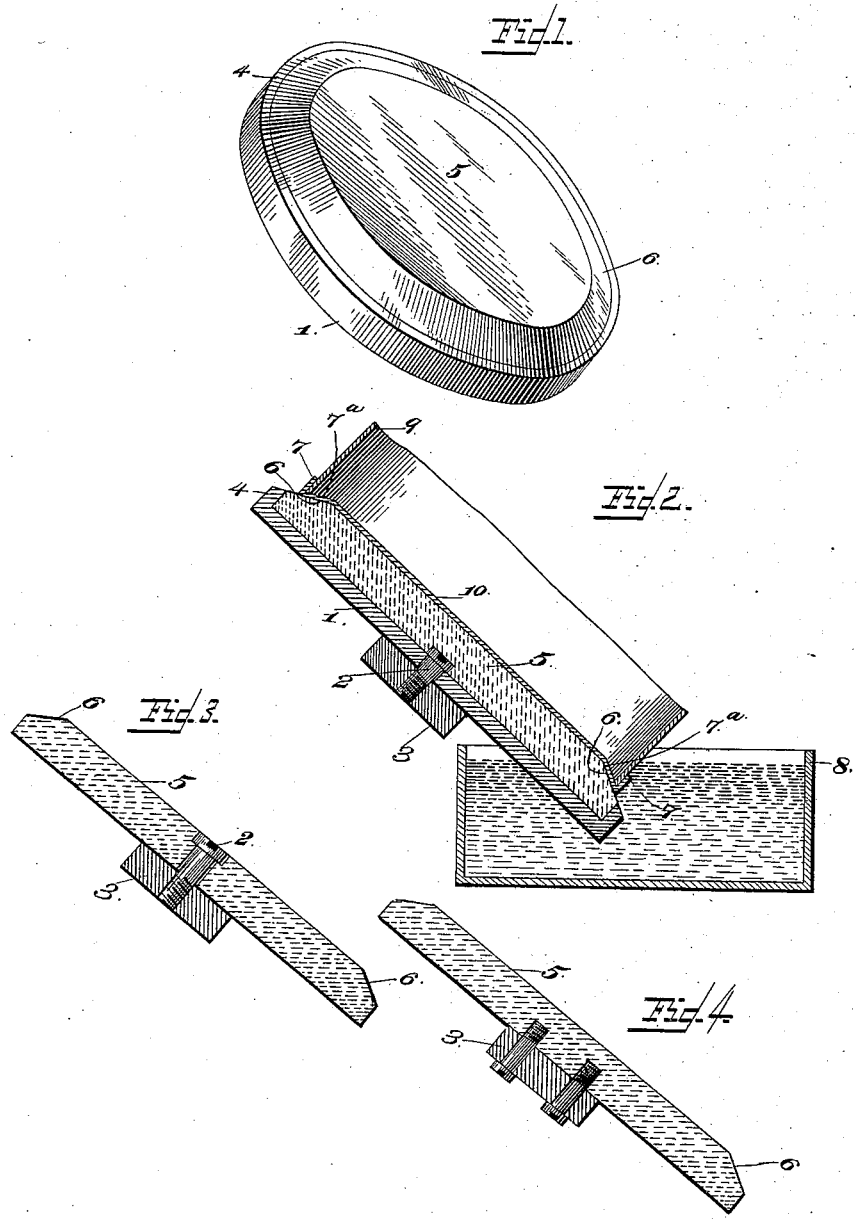
Witnesses
M. Fowler
Wm. Bagger
Inventor
Walter J. Phelps
By his Attorneys
C. A. Snow & Co.

UNITED STATES PATENT OFFICE.

WALTER J. PHELPS, OF BALTIMORE, MARYLAND.

APPARATUS FOR SOLDERING METALLIC VESSELS.

SPECIFICATION forming part of Letters Patent No. 468,896, dated February 16, 1892.

Application filed May 9, 1891. Serial No. 392,156. (No model.)

*To all whom it may concern:*

Be it known that I, WALTER J. PHELPS, a citizen of the United States, residing at Baltimore, in the State of Maryland, have invented a new and useful Apparatus for Soldering Tin Cans, of which the following is a specification.

This invention relates to apparatus for soldering the heads or ends upon tin cans; and it has for its prime object to effect a saving in the consumption of solder used for this purpose.

My improved apparatus or device is especially adapted to be used in connection with the so-called "dipping" process of soldering, whereby the edges of the can, after the heads or ends have been placed in position upon the can-body, are immersed and rotated in a bath of molten solder. This has been done sometimes by hand and sometimes by machines specially constructed for this purpose. The objection to this process has been that the solder has been applied not merely to the seams, but to the outer edges of the can-heads as well, a considerable portion of solder being thus wasted by applying it not only to the seams where its presence is required, but also to parts of the can-heads where it is not only unnecessary, but also unsightly and undesirable.

The object of my invention is to apply the solder to the sides of the can-body where the seams are located only and to keep the outer sides or ends of the can-heads entirely free from solder; and with this end in view the invention consists in the improved construction and arrangement of parts which will be hereinafter fully described, and particularly pointed out in the claims.

In the drawings hereto annexed, Figure 1 is a perspective view of a device constructed in accordance with my invention. Fig. 2 is a sectional view of the same. Fig. 3 is a sectional view illustrating a modification. Fig. 4 is a sectional view showing another modification.

Like numerals of reference indicate like parts in all the figures.

1 designates a circular disk or plate, which may be constructed of cast-iron, and which is mounted revolubly upon a spindle 2, attached to a block or supporting-disk 3. The disk 1 is provided with an annular flange 4, so as to form a receptacle in which is seated a bearing-disk 5, which may be constructed of asbestus, slate, glass, or any other suitable material to which solder will not adhere and which will not be injured by the heat of the solder-bath in which it is in practice to be immersed. The bearing-disk 5, which is of greater diameter than the head of the can which is to be operated upon, has a beveled edge, as shown at 6, to fit it to the configuration of the can-head, which is stamped in the usual manner to form an annular flange 7 and bead 7ª at its outer edge.

In practice the disk 1, having the bearing-disk 5, is arranged or supported in an inclined position, with its lower edge dipping into a bath of molten solder, as shown at 8. The can, upon the body of which 9 the head 10 has been placed in position, is then placed against the bearing-disk 5, the beveled edge of which 6 will fit against the beaded edge 7ª of the can-head. The solder will thus be prevented from reaching the outer side of the can-head and will be applied only to the edge where the seam is located when the can-body is rotated in contact with the revolving disk, thus applying solder entirely around the seam. The can may be manipulated by hand or the supporting-disk may be mounted in a suitably-constructed machine as a part of such machine, the can being held between said disk and a supplemental clamping-disk and rotary motion being imparted thereto in any suitable manner.

A modification of my invention has been shown in Fig. 3 of the drawings, whereby the flanged disk 1 is dispensed with, the supporting-disk or bearing-disk having the beveled edge 6 being journaled directly to a supporting-block, as 3. The disk 5 in this case is to be made, as before, of asbestus, slate, or any other suitable material to which solder will not adhere and which is not affected by the heat of the solder-bath.

By another modification, which is illustrated in Fig. 4 of the drawings, the disk 5 is made stationary and not capable of being revolved. By this latter construction the can, when placed in contact therewith, is rotated over the face of said disk, and the result obtained is substantially the same.

When the cast-iron supporting-disk is used, said disk is liable to become tinned over; but this is immaterial and will not interfere with the operation of the device, for the reason that the said cast-iron disk does not at any time come in contact with the can which is being soldered. That portion of the bearing-disk which projects beyond the beveled edge 6 also serves to protect the edge of the can, to prevent the solder from adhering to the extreme edge thereof, and to permit superfluous solder to run back into the bath or receptacle. For the reasons stated it will be seen that it is of importance that the bearing-disk shall project beyond the edge of the can-head or be of greater diameter than the latter.

From the foregoing description, taken in connection with the drawings hereto annexed, the operation and advantages of my invention will be readily understood.

My invention is exceedingly simple in construction, and it may be readily applied to devices for soldering cans either by hand or by machinery.

Having thus described my invention, what I claim, and desire to secure by Letters Patent of the United States, is—

1. In a device for soldering cans, the combination, with a solder bath, of an inclined bearing-disk dipping into said bath and having a beveled edge to form a seat for the beaded and flanged head of the can which is to be operated upon, substantially as and for the purpose set forth.

2. In a device for soldering cans, the combination, with a solder bath, of an inclined disk dipping into said bath and having an annular beveled edge to receive the beaded and flanged head of the can which is to be operated upon, said disk being composed of asbestus, slate, or other material to which solder will not adhere and which is not affected by the heat of the solder bath, and said disk being also of greater diameter than the head of the can which is to be operated upon, substantially as and for the purpose set forth.

3. In a device for soldering cans, the combination, with a solder bath, of an inclined flanged disk and a bearing-disk of asbestus, slate, or equivalent material seated in said flanged disk, substantially as and for the purpose set forth.

4. In a device for soldering cans, the combination, with a solder bath, of a revoluble flanged supporting-disk mounted in an inclined position and a bearing-disk seated upon said supporting-disk, substantially as and for the purpose set forth.

In testimony that I claim the foregoing as my own I have hereto affixed my signature in presence of two witnesses.

WALTER J. PHELPS.

Witnesses:
EDWIN PHELPS,
PER LEE BUCK.